United States Patent [19]
Asada

[11] Patent Number: 5,799,971
[45] Date of Patent: Sep. 1, 1998

[54] SEAT STRUCTURE EQUIPPED WITH SIDE IMPACT AIR BAG

[75] Inventor: Koujirou Asada, Aichi-ken, Japan

[73] Assignee: Toyota Jidosha Kabushiki Kaisha, Toyota, Japan

[21] Appl. No.: 752,035

[22] Filed: Nov. 19, 1996

[30] Foreign Application Priority Data

Dec. 14, 1995 [JP] Japan ............................ 7-326047
Apr. 10, 1996 [JP] Japan ............................ 8-087979

[51] Int. Cl.⁶ .................................................. B60K 21/22
[52] U.S. Cl. ............................... 280/730.2; 280/728.3
[58] Field of Search ........................... 280/728.3, 730.1, 280/730.2

[56] References Cited

U.S. PATENT DOCUMENTS

| | | |
|---|---|---|
| 5,112,079 | 5/1992 | Haland et al. . |
| 5,222,761 | 6/1993 | Kaji et al. . |
| 5,251,931 | 10/1993 | Semchena et al. . |
| 5,348,342 | 9/1994 | Haland et al. . |
| 5,451,075 | 9/1995 | Parker et al. .................. 280/728.3 |
| 5,498,030 | 3/1996 | Hill et al. . |
| 5,499,840 | 3/1996 | Nakano . |
| 5,533,750 | 7/1996 | Karlow et al. ................. 280/730.2 |
| 5,542,696 | 8/1996 | Steffens, Jr. et al. .......... 280/730.1 |

FOREIGN PATENT DOCUMENTS 4-356246  12/1992  Japan .

*Primary Examiner*—Eric D. Culbreth
*Attorney, Agent, or Firm*—Cushman Darby & Cushman IP Group of Pillsbury Madison & Sutro LLP

[57] ABSTRACT

A seat structure equipped with a side impact air bag apparatus in which, when an external force is applied to a side of a vehicle, an air bag apparatus mounted to a side portion of a seat back frame is operated, a sewn portion of seat surface layers is ruptured, and thereafter, an air bag body is unfolded, includes an air bag case, the air bag case having a lid which is opened due to the unfolding of the air bag body. When the lid is opened, a seat pad which is disposed further toward the front of the vehicle than the lid is compressed by the lid toward the inner side of a seat back in the transverse direction of the seat back.

24 Claims, 11 Drawing Sheets

SEAT STRUCTURE EQUIPPED WITH SIDE IMPACT AIR BAG

BACKGROUND OF THE INVENTION

1. Field of the Invention

The present invention relates to a seat structure equipped with a side impact air bag, and more particularly to a seat structure which is equipped with a side impact air bag at a side portion of a seat back.

2. Description of the Related Art

Conventionally, in a seat structure equipped with a side impact air bag apparatus, the side impact air bag apparatus is built in a side portion of a seat back at a door side thereof. When an external force is applied to the side of a vehicle, an air bag body is unfolded between the door and an occupant side portion. Such a seat structure is disclosed in JP-A No. 4-356246, U.S. Pat. No. 5,499,840, No. 5,112,079, No. 5,222,761, No. 5,251,931, No. 5,348,342, No. 5,498,030, and the like. Among others, JP-A No. 4-356246 discloses a seat structure which limits the degree to which an air bag lid is opened. U.S. Pat. No. 5,499,840 discloses a seat structure in which a side impact air bag is provided within a projecting portion which is provided at an upper portion of a seat back and opposes a side wall of a vehicle body. The projecting portion is provided such that, when an external force is applied to the side of the vehicle, the side wall of the vehicle body is prevented from entering into the vehicle compartment.

Further, as illustrated in FIG. 10, in a seat structure equipped with a side impact air bag apparatus disclosed in U.S. Pat. No. 5,348,342, by using an air bag apparatus mounted to an outer side of a side portion of a seat back 82 of a seat 80, an air bag body 84 is unfolded between an occupant seated in the seat 80 and a door such that the occupant is protected from the side impact.

Moreover, as illustrated in FIG. 11, in this seat structure equipped with the side impact air bag apparatus, when the air bag body 84 is unfolded due to the gas injected from an inflator 88, a lid 86A of an air bag case 86 is opened in an outward direction around a hinge portion 86B formed at a rear end of the air bag case 86 (the direction of arrow W in FIG. 11). Further, due to the opening of the lid 86A, a portion 92 at which a side seat surface layer 90 and front seat surface layer 91 are sewn together (hereinafter, "sewn portion") is ruptured.

However, in this seat structure equipped with the side impact air bag apparatus, if a relatively easily extended material such as a knit is used for the seat surface layers 90 and 91, in the initial stages of the unfolding of the air bag body 84, as illustrated in a chain double-dashed line in FIG. 11, the seat surface layer 90 may extend a large amount toward the outer side of the seat 80 in the transverse direction thereof. Therefore, it is difficult for the sewn portion 92 which should be originally torn to be torn. As a result, the unfolding of the air bag body 84 is slowed down and the configuration of the unfolded air bag body 84 is not stable.

SUMMARY OF THE INVENTION

With the aforementioned in view, an object of the present invention is to provide a seat structure equipped with a side impact air bag apparatus in which the time required for the air bag body to completely unfold is reduced and in which the configuration of the unfolded air bag body is stabilized.

A first aspect of the present invention is a seat structure equipped with a side impact air bag apparatus in which, when an external force is applied to a side of a vehicle, an air bag apparatus mounted to a side portion of a seat back frame is operated, a sewn portion of seat surface layers is ruptured, and thereafter, an air bag body is unfolded, comprising: an air bag case, the air bag case having a lid which is opened due to the unfolding of the air bag body, and when the lid is opened, a seat pad which is disposed further toward the front of the vehicle than the lid is compressed by the lid toward the inner side of a seat back in the transverse direction of the seat back.

In accordance with the first aspect of the present invention, when the external force is applied to the side of the vehicle so as to operate the air bag apparatus, the lid of the air bag case is opened due to the pressure of the inflating air bag body. At this time, the seat pad which is disposed forwardly of the lid is compressed by the lid toward the inner side of the seat back in the transverse direction thereof so that the locus of unfolding of the air bag body is increased. Further, superior effects are achieved in that the time required for the air bag body to completely unfold is reduced and the configuration of the unfolded air bag body is stabilized.

A second aspect of the present invention is a seat structure equipped with a side impact air bag apparatus in which, when an external force is applied to a side of a vehicle, an air bag apparatus mounted to a side portion of a seat back frame is operated, a sewn portion of seat surface layers is ruptured, and thereafter, an air bag body is unfolded, comprising: an air bag case, the air bag case having a lid which is opened due to the unfolding of the air bag body, the lid forming a French door structure, the lid including an outer lid which opens toward the outer side of the seat back in the transverse direction of the seat back and an inner lid which opens toward the inner side of the seat back in the transverse direction of the seat back; and a standard sewn portion which is a sewn portion of the seat surface layers which is ruptured at the time of unfolding of the air bag body, the seat surface layer which is disposed further toward the front of the vehicle than the standard sewn portion being provided so as to connect the inner lid.

In accordance with the second aspect of the present invention, when the external force is applied to the side of the vehicle so as to operate the air bag apparatus which is mounted to the side portion of the seat back frame in the transverse direction thereof, the air bag body is inflated so as to press and expand the lid of the air bag case. At this time, the outer lid is opened toward the outer side of the seat back in the transverse direction thereof such that the seat surface layer, which is disposed rearwardly of the standard stitch, is pressed toward the outer side of the seat back in the transverse direction thereof. At the same time, the inner lid is opened toward the inner side of the seat back in the transverse direction thereof such that the seat surface layer, which is disposed forwardly of the standard stitch connected to the inner lid, is pulled toward the inner side of the seat back in the transverse direction thereof. Accordingly, load generated by the inflation of the air bag body so as to press and expand the lid of the air bag case is concentrated on the stitch. Further, as the inner lid is opened, the seat surface layer, which is disposed forwardly of the standard stitch, is pulled toward the inner side of the seat back in the transverse direction thereof such that the seat surface layer withdraws from the locus of unfolding of the air bag body. At the same time, the seat pad, which is disposed at the inner side of the seat surface layer, is compressed in the inner direction of the seat. Moreover, superior effects are achieved in that the time required for the air bag body to completely unfold is reduced and the configuration of the unfolded air bag body is stabilized.

A third aspect of the present invention is a seat structure equipped with a side impact air bag apparatus according to the second aspect of the present invention, wherein the air bag case is made of a resin and includes a hinge portion, and the outer lid and the inner lid are integrally formed with the air bag case via the hinge portion.

In accordance with the third aspect of the present invention, it is easier to manufacture the air bag case at a reduced cost.

A fourth aspect of the present invention is a seat structure equipped with a side impact air bag apparatus according to the second and third aspects of the present invention, wherein the inner lid includes engaging means, and the engaging means directly engages the seat surface layer which is disposed further toward the front of the vehicle than the standard sewn portion.

In accordance with the fourth aspect of the present invention, when the seat structure equipped with the side impact air bag apparatus is assembled, the seat surface layer, which is disposed further toward the front of the vehicle than the standard sewn portion, directly engages the engaging means formed at the inner lid. Therefore, the seat surface layer, which is disposed further toward the front of the vehicle than the standard portion, is connected to the inner lid. Accordingly, a superior effect is achieved in that assembling operation of the seat structure equipped with the side impact air bag apparatus is improved.

A fifth aspect of the present invention is a seat structure equipped with a side impact air bag apparatus according to the second and third aspects of the present invention, further comprising: a tension-transmitting member which is provided so as to be connected with the seat surface layer which is disposed further toward the front of the vehicle than the standard sewn portion, the engaging means formed at the inner lid engaging the seat surface layer, which is disposed further toward the front of the vehicle than the standard sewn portion, via the tension-transmitting member.

In accordance with the fifth aspect of the present invention, when the seat structure equipped with the side impact air bag apparatus is assembled, the seat surface layer which is disposed further toward the front of the vehicle than the standard sewn portion engages the engaging means formed at the inner lid via the tension-transmitting means. Thus, the seat surface layer, which is disposed forwardly of the standard sewn portion, is connected to the inner lid. Further, a superior effect is achieved in that the intensity of the engaged portion improves.

A sixth aspect of the present invention is a seat structure equipped with a side impact air bag apparatus in which, when an external force is applied to a side of a vehicle, an air bag apparatus mounted to a side portion of a seat back frame is operated, a sewn portion of seat surface layers is ruptured, and thereafter, an air bag body is unfolded, comprising: an air bag case, the air bag case having a lid which is opened due to the unfolding of the air bag body, the lid including an outer lid which opens toward the outer side of the seat back in the transverse direction of the seat back and an inner lid which opens toward the inner side of the seat back in the transverse direction of the seat back, the lid forming a French door structure; and a stopper which limits the degree to which the outer lid opens to a predetermined range. in accordance with the sixth aspect of the present invention, when the external force is applied to the side of the vehicle so as to operate the air bag apparatus, the lid is opened due to the pressure of the inflating air bag body. At this time, the outer lid abuts the stopper at the time when the outer lid is opened by a small amount, and the unfolding of the air bag body toward the outer side of the seat back in the transverse direction thereof is prevented. As a result, the unfolding of the air bag body toward the outer side of the seat back in the transverse direction thereof is limited, and the unfolding force of the air bag body is concentrated on the diagonally forward direction of the vehicle in accordance with the degree to which the outer lid is opened. On the other hand, the inner lid is pressed by the air bag body, which is unfolded in the diagonally forward direction of the vehicle, such that the inner lid is opened so as to press away the seat pad, which is disposed forwardly of the inner lid, from the outer side of the seat to the inner side thereof. Accordingly, the locus of unfolding of the air bag body increases. Further, superior effects are achieved in that the time required for the air bag body to completely unfold is reduced and the configuration of the unfolded air bag body is stabilized.

A seventh aspect of the present invention is a seat structure equipped with a side impact air bag apparatus according to the sixth aspect of the present invention, wherein the inner lid is provided such that the range over which the inner lid opens towards the front of the vehicle is wider than the range over which the outer lid opens towards the front of the vehicle, and the outer lid and the inner lid are integrally formed with the air bag case via the hinge portion formed at the air bag case, and the inner lid includes an engaging portion, and the inner lid is disposed at the side portion provided at the end portion of the seat back in the transverse direction of the seat back and engages the outer lid, and the inner lid and the outer lid are provided such that the inner lid and the outer lid can be separated by the engaging portion due to the inflating pressure of the air bag body.

In accordance with the seventh aspect of the present invention, the engaging portion, which is disposed at the side portion of the seat back, is disengaged from the outer lid due to the inflating pressure of the air bag body such that the outer and inner lids are opened around the hinge portion. At this time, since the range over which the inner lid opens towards the front of the vehicle is wider than that of the outer lid, the locus of unfolding of the air bag body is further increased and the direction of unfolding of the air bag body is controlled. Further, superior effects are achieved in that the time required for the air bag body to completely unfold is reduced and the configuration of the unfolded air bag body is stabilized.

A eighth aspect of the present invention is a seat structure equipped with a side impact air bag apparatus according to the sixth aspect of the present invention, wherein the stopper is formed by a highly rigid material, a longitudinal direction of the stopper extends in a vertical direction of the vehicle, a cross-sectional configuration of the stopper is formed in a substantially U-shaped configuration in which end portions of the stopper are oriented inwardly in the transverse direction of the seat, and the stopper is fixed to a side portion of the seat back frame in the transverse direction of the seat so as to cover the air bag body.

In accordance with the eighth aspect of the present invention, when the external force is applied to the side of the vehicle, even if the inner portion of the vehicle compartment is moved toward the inner side of the vehicle compartment in the transverse direction of the vehicle, the stopper receives the load and the seat back frame is pressed toward the inner side of the vehicle. The substantially U-shaped space of the stopper is maintained in the same state as its initial state. Further, a superior effect is achieved in that the air bag body can be reliably unfolded.

DESCRIPTION OF THE PREFERRED EMBODIMENTS

A first embodiment of a seat structure equipped with a side impact air bag apparatus will be described in accordance with FIGS. 1 through 4.

In all of the drawings, arrow FR denotes a forward direction of a seat (i.e., the direction along a longitudinal direction of a vehicle); arrow UP indicates an upward direction of the seat (i.e., the direction along a vertical direction of the vehicle); and arrow IN denotes an inward direction of the seat in the transverse direction thereof.

Figure 4:
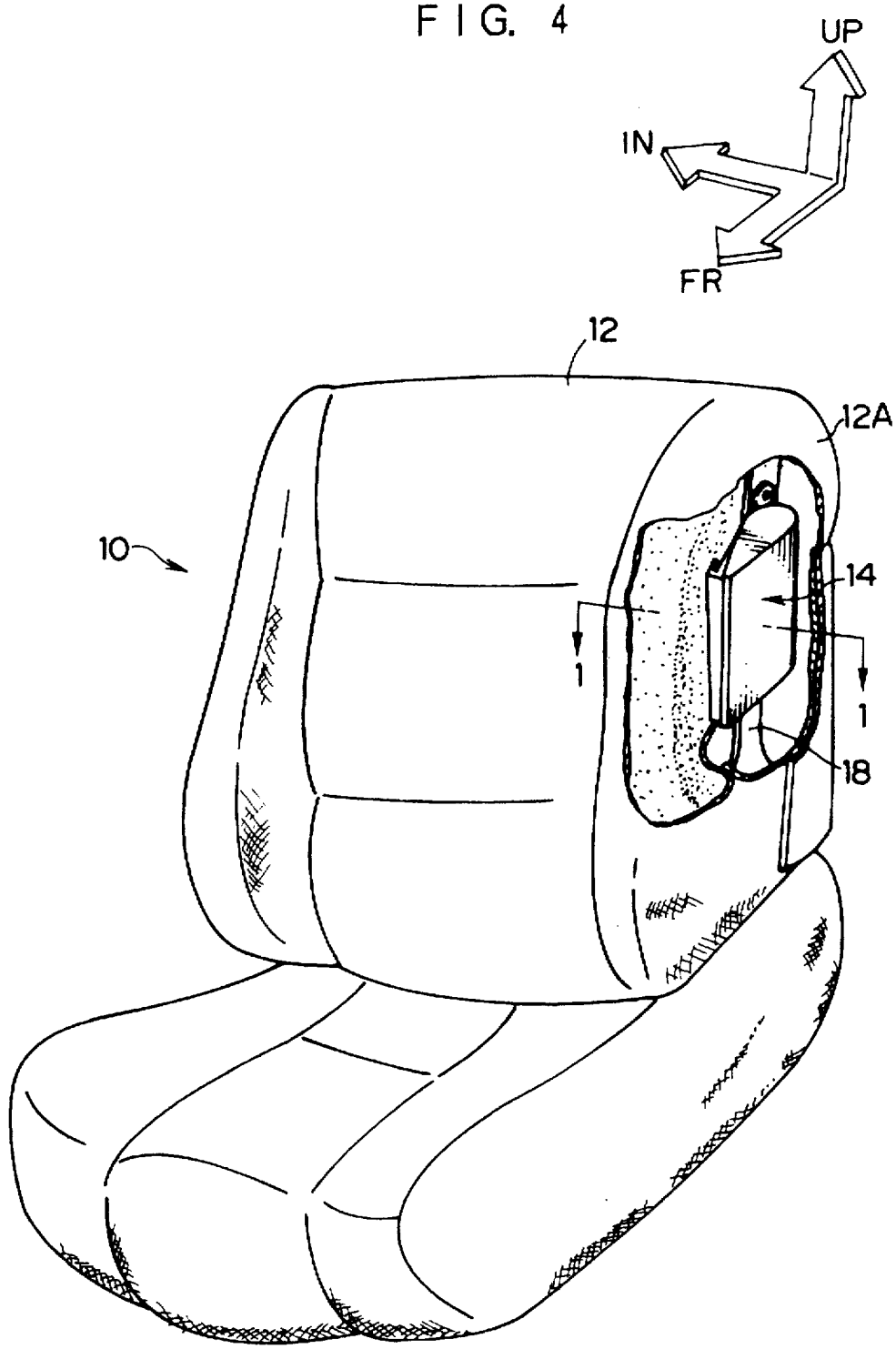
FIG. 4 is a perspective view which, seen from the diagonally forward direction of the vehicle, shows a seat to which the seat structure equipped with the side impact air bag relating to the first embodiment of the present invention is applied.

As illustrated in FIG. 4, in the seat structure equipped with the side impact air bag apparatus of the first embodiment, a box-shaped air bag apparatus 14, which extends in the vertical direction of the vehicle, is provided within a side portion 12A formed at a seat back 12 on the outer side of a seat 10 in the transverse direction of the vehicle.

Figure 1:
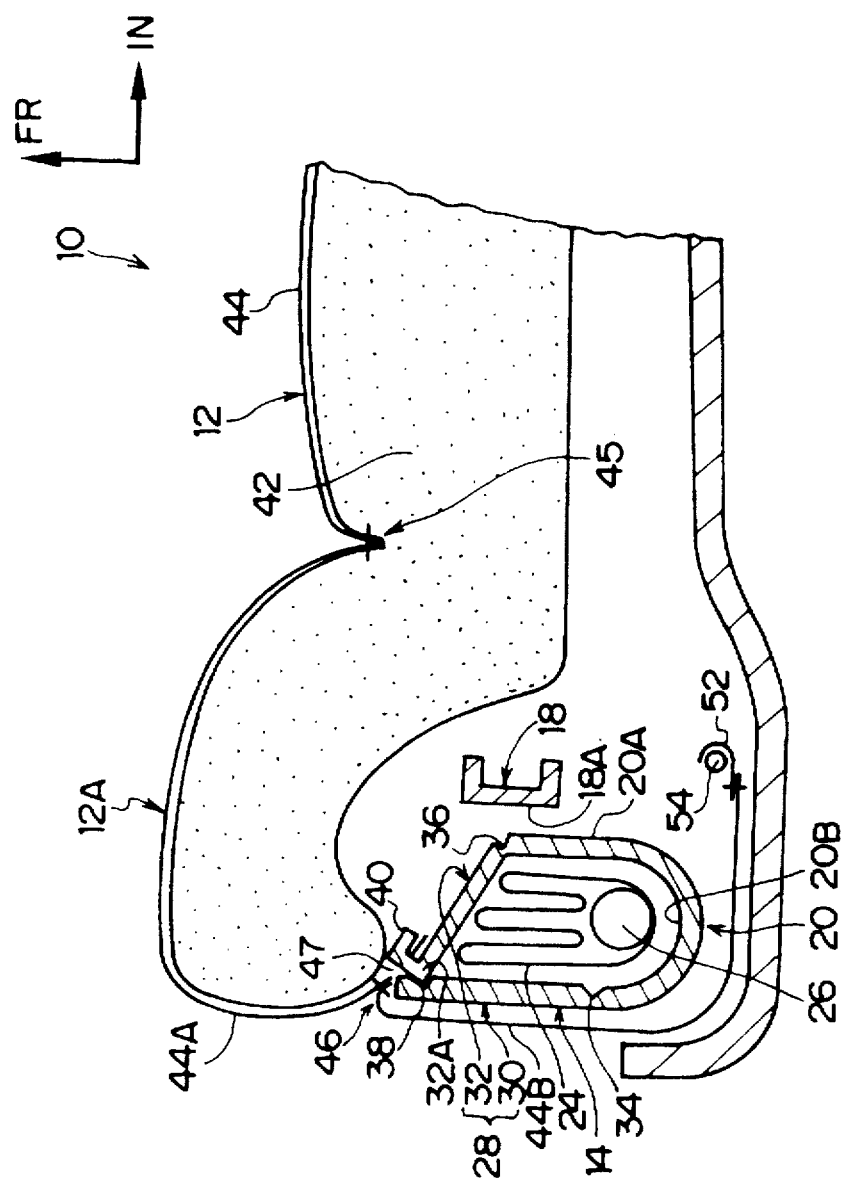
FIG. 1 is an enlarged sectional view taken along a line 1—1 of FIG. 4.

As illustrated in FIG. 1, a side frame 18, which forms a seat back frame, is provided within the side portion 12A of the seat back 12. A base portion 20A of an air bag case 20, which is made of a resin, is mounted to an outer surface 18A of the side frame 18 in the transverse direction of the seat 10 by an unillustrated fastening member such as a bolt and a nut.

The cross-sectional configuration of the base portion 20A of the air bag case 20, when viewed in the vertical direction of the seat 10, is a substantially U-shaped configuration in which the open portion of the air bag case 20 is directed toward the front of the seat 10. A folded air bag body 24 is accommodated within the base portion 20A. In addition, a cylindrical inflator 26 whose longitudinal direction runs along a vertical direction of the seat 10 is accommodated in the base portion 20A in a vicinity of a rear portion 20B of the base portion 20A.

A lid 28 of the air bag case 20 forms a French, or double door structure and includes an outer lid 30, which opens toward the outer side of the seat 10 in the transverse direction thereof, and an inner lid 32, which opens toward the inner side of the seat 10 in the transverse direction thereof. When the lid 28 is closed (as shown in FIG. 1), the outer lid 30 forms a part of a wall portion of the air bag case 20 on the outer side of the seat 10 in the transverse direction thereof. The outer lid 30 is integrally formed with a front end portion of an outer wall of the base portion 20A in the transverse direction of the seat 10 via an integral hinge 34 serving as a hinge portion.

Further, the inner lid 32 is integrally formed with a front end portion of an inner wall of the base portion 20A in the transverse direction of the seat 10 via an integral hinge 36 serving as a hinge portion. Moreover, the inner lid 32 is inclined around the integral hinge 36 outwardly and forwardly of the seat 10.

As shown in FIG. 1, an engaging groove 38 whose cross-sectional configuration is substantially V-shaped along the vertical direction of the seat 10 is formed at the front end portion of the outer lid 30. A front end corner portion 32A of the inner lid 32 engages the engaging groove 38.

Figure 2:
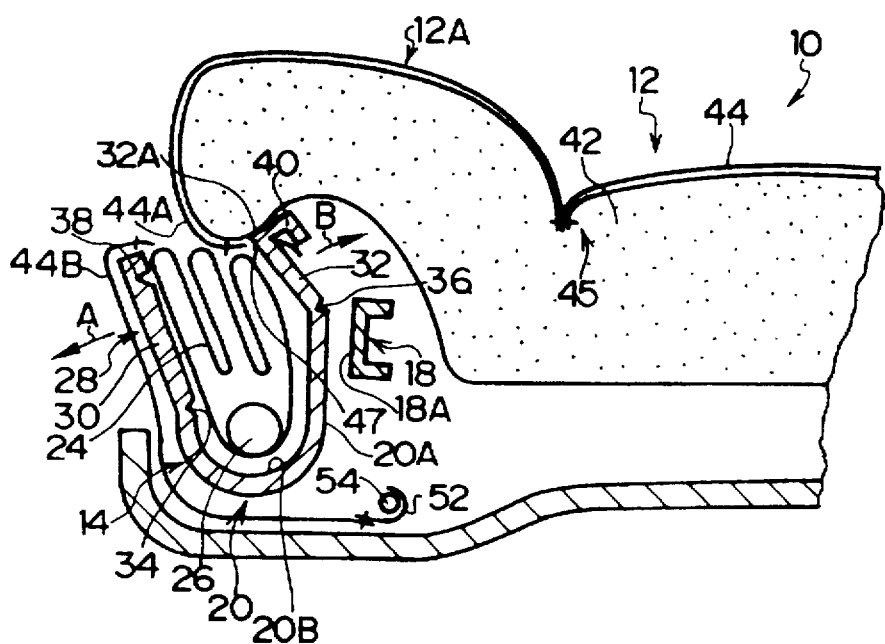
FIG. 2 is a cross-sectional view, which corresponds to FIG. 1, showing a state immediately after an air bag body of a seat structure equipped with a side impact air bag relating to a first embodiment of the present invention starts to unfold.

Accordingly, as illustrated in FIG. 2, when the air bag body 24 is unfolded due to the gas injected from the inflator 26, the engaging groove 38 of the outer lid 30 and the front end corner portion 32A of the inner lid 32 are disengaged. The outer lid 30 is opened around the integral hinge 34 toward the outer side of the seat 10 in the transverse direction thereof (the direction of arrow A in FIG. 2), while the inner lid 32 is opened around the integral hinge 36 toward the inner side of the seat 10 in the transverse direction thereof (the direction of arrow B in FIG. 2).

As illustrated in FIG. 1, a plurality of hook portions 40 serving as an engaging means are formed at the front end portion of the inner lid 32 at predetermined intervals along the vertical direction of the seat 10. An outer side of a seat pad 42 which covers an occupant abutting side of the seat back frame is covered by a seat surface 44. Several seat surface layers 44A, 44B are sewn at stitches 45, 46 and the like. When the air bag body 24 is unfolded, a standard stitch 46, which opposes a front end edge portion of the outer lid 30 of the air bag case 20, is ruptured. The standard stitch 46 is a portion at which a seat surface layer 44A, which is disposed further toward the front of the vehicle than the standard stitch 46, and a seat surface layer 44B, which is disposed further toward the back of the vehicle than the standard stitch 46 and which covers the outer lid 30, are sewn together.

Moreover, a plurality of engaging holes 47 are punched at an end portion of the seat surface layer 44A, at predetermined intervals along a vertical direction of the seat 10. These engaging holes 47 engage the hook portions 40 of the inner lid 32.

Further, a hook 52 is fixed to an end portion of the seat surface layer 44B, which covers the outer lid 30, at the rear side of the seat 10. The hook 52 is engaged with a seat wire 54.

Next, the operation of the first embodiment will be explained.

In the seat structure equipped with the side impact air bag apparatus of the first embodiment, when the external force is applied to the side of the vehicle so as to operate the inflator 26 of the air bag apparatus 14, the air bag body 24 is inflated due to the gas injected from the inflator 26. Due to this inflating force of the air bag body 24, the outer lid 30 opens around the integral hinge 34 in the outward direction (the direction of arrow A in FIG. 2) of the seat 10, and the inner lid 32 opens around the integral hinge 36 in the inward direction (the direction of arrow B in FIG. 2) of the seat 10.

At this time, because the seat surface layer 44A, which is disposed forwardly of the standard stitch 46, and the hook portion 40 formed at the inner lid 32 are connected, the seat surface layer 44A is pulled by the inner lid 32 toward the inner side of the seat 10. The seat surface layer 44B, which is disposed rearwardly of the standard stitch 46, is pressed by the outer lid 30 toward the outer side of the seat 10.

Consequently, the load, which is generated by the inflation of the air bag body 24 so as to open the inner lid 32 and the outer lid 30 in a manner resembling the opening of French doors, is concentrated on the stitch 46. As a result, the stitch 46 is instantaneously ruptured. Therefore, even if a relatively easily extended material such as a knit is used for the seat surface layer, the time required for the air bag body to completely unfold is reduced and the configuration of the unfolded air bag body is stabilized.

Figure 3:
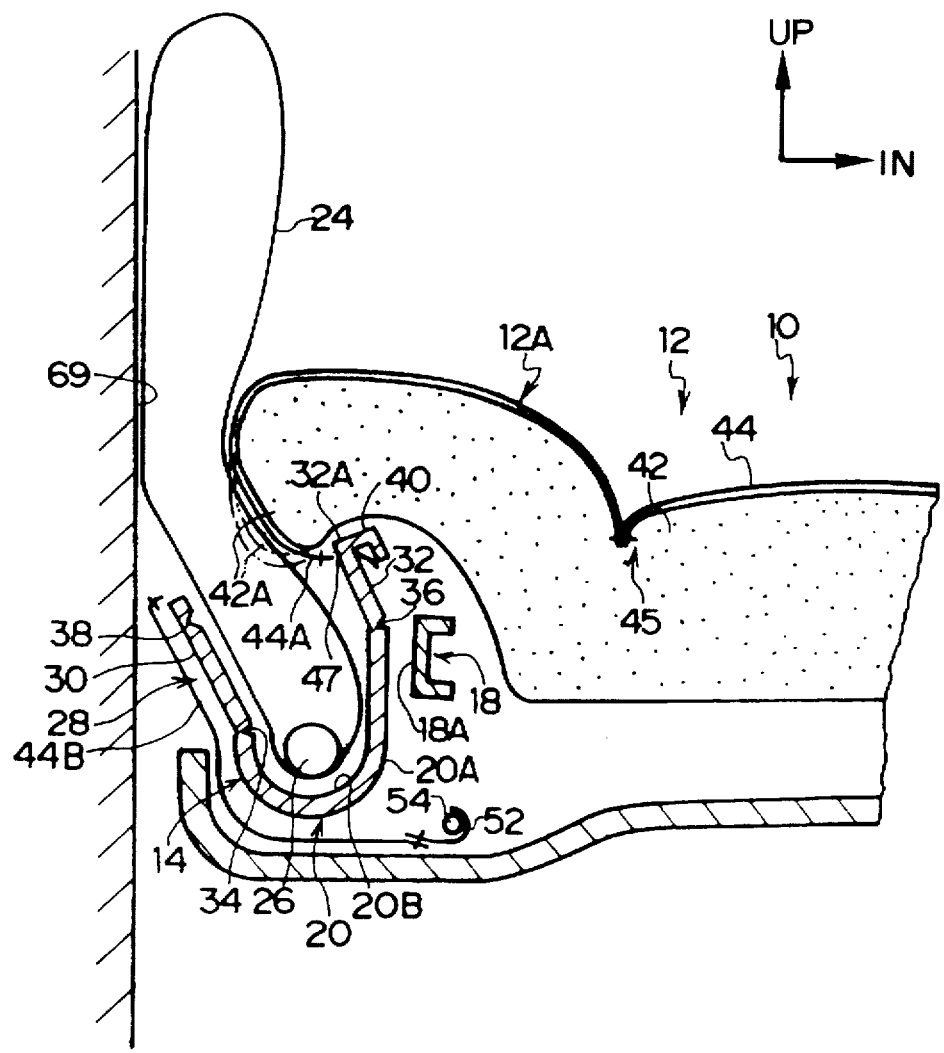
FIG. 3 is a cross-sectional view, which corresponds to FIG. 1, showing a state immediately after the air bag body of the seat structure equipped with the side impact air bag relating to the first embodiment of the present invention is completely unfolded.

Further, in the seat structure equipped with the side impact air bag apparatus of the first embodiment, as shown in FIG. 3, as the inner lid 32 is opened, the seat surface layer 44A, which is disposed forwardly of the standard stitch 46, is pulled toward the inner side of the seat 10 such that the seat surface layer 44A withdraws from the locus of unfolding of the air bag body 24. At the same time, a seat pad 42A, which is disposed at the inner side of the seat surface layer 44A, is compressed in the inner direction of the seat 10. Accordingly, the open area for unfolding of the air bag body 24 can be increased, and further, the air bag body 24 can be quickly unfolded along the surface of a door trim 69.

Moreover, in the seat structure equipped with the side impact air bag apparatus of the first embodiment, the seat surface layer 44A, which is disposed forwardly of the standard stitch 46, is directly engaged with the hook portion 40 of the inner lid 32 by the engaging hole 47 punched at the end portion of the seat surface layer 44A. Accordingly, assembly of the air bag apparatus to the seat 10 is simplified.

Further, in the seat structure equipped with the side impact air bag apparatus of the first embodiment, before the side impact air bag apparatus 14 is assembled to the seat back 12, the front end corner portion 32A of the inner lid 32 is engaged with the engaging groove 38 formed at the front end portion of the outer lid 30. Accordingly, the open portion of the air bag case 20 can be closed by the lid 28. As a result, contamination due to a foreign object entering the air bag case 20 can be prevented, and a conventional seal for preventing the contamination of the foreign object can be eliminated.

Figure 5:
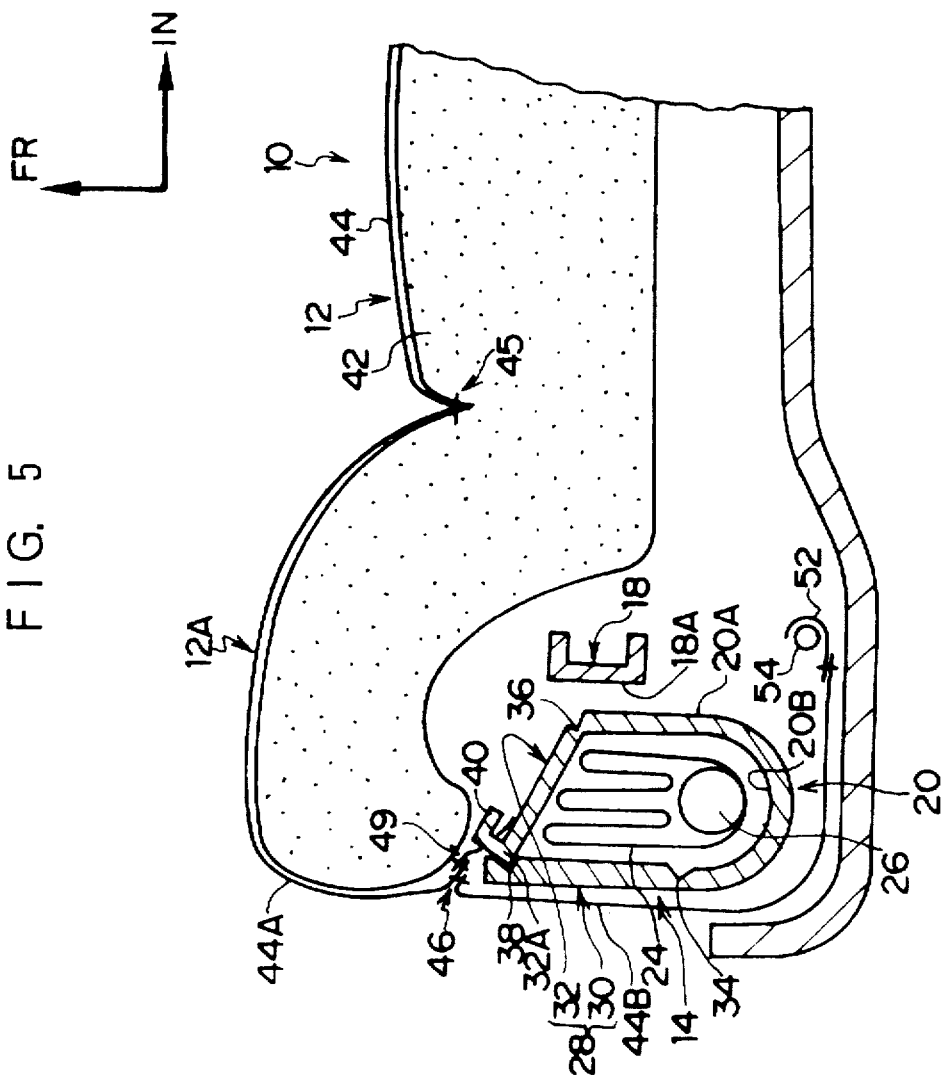
FIG. 5 is a cross-sectional view, which corresponds to FIG. 1, showing a seat structure equipped with a side impact air bag relating to a variant example of the first embodiment of the present invention starts to unfold.

In the seat structure equipped with the side impact air bag apparatus of the first embodiment, the seat surface layer 44A, is directly engaged with the hook portion 40 of the inner lid 32 by the engaging hole 47 punched at the end portion of the seat surface layer 44A. Alternatively instead of this, as shown in FIG. 5, a stay cloth 49 serving as a tension-transmitting member may be sewn to the end portion of the seat surface layer 44A such that the seat surface layer 44A is indirectly engaged with the hook portion 40 of the inner lid 32 by the engaging hole, which is punched at the end portion of the stay cloth 49. By using the stay cloth 49, tension from the hook portion 40 can be transmitted to the seat surface layer 44A.

Next, a second embodiment of a seat structure equipped with a side impact air bag apparatus of the present invention will be described in accordance with FIGS. 6 through 9.

Members which are the same as those in the previously-described embodiment are denoted by the same reference numerals, and descriptions thereof are omitted.

Figure 9:
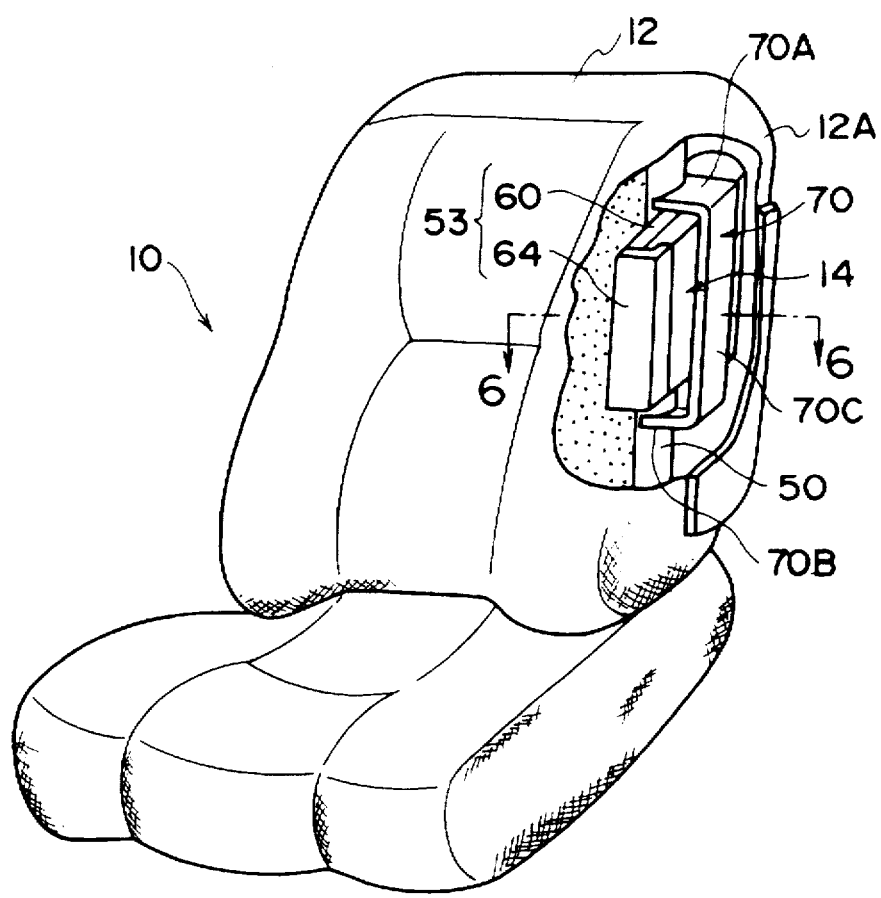
FIG. 9 is a perspective view which, seen from the diagonally forward direction of the vehicle, shows a seat to which the seat structure equipped with the side impact air bag relating to the second embodiment of the present invention is applied.
Figure 10:
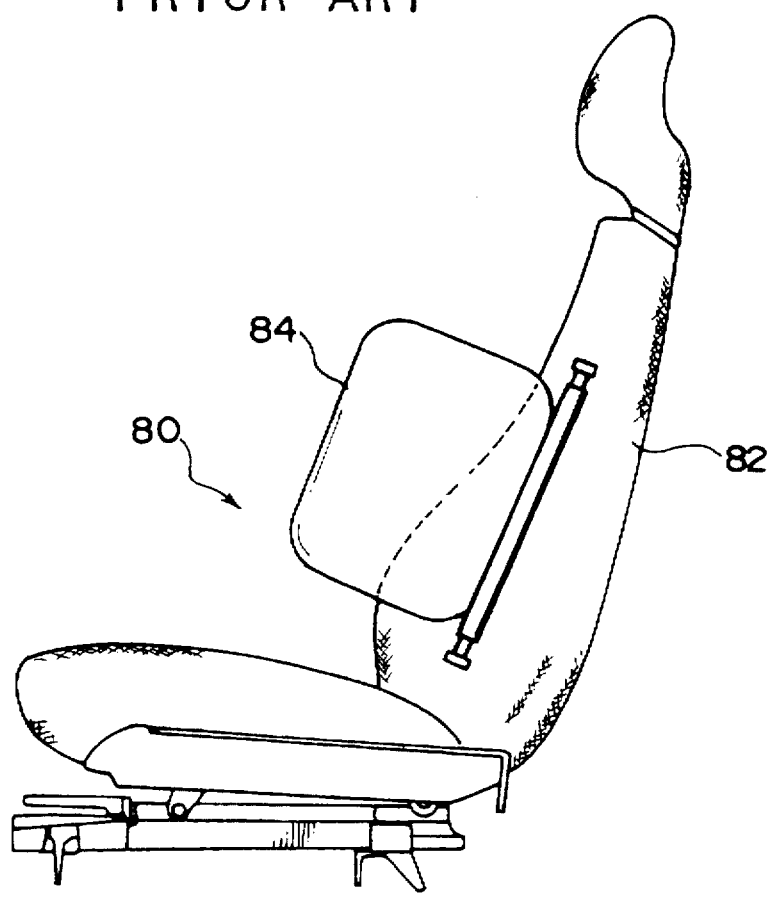
FIG. 10 is a schematic side view which shows a seat structure equipped with a side impact air bag apparatus relating to a conventional example.
Figure 11:
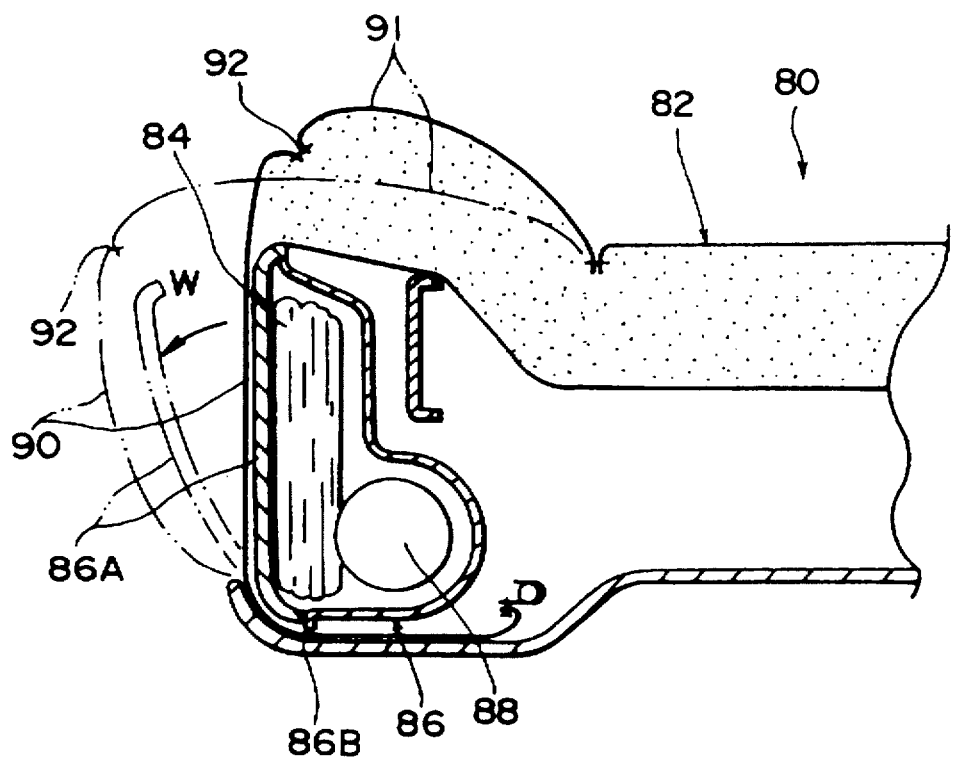
FIG. 11 is a horizontal sectional view which shows a side portion of a seat structure equipped with a side impact air bag apparatus relating to another conventional example.

As illustrated in FIG. 9, in the seat structure equipped with the side impact air bag apparatus of the second embodiment, a box-shaped air bag apparatus 14, which extends in the vertical direction of the vehicle, is provided within a side portion 12A formed at a seat back 12 on the outer side of the seat 10 in the transverse direction of the vehicle.

Figure 6:
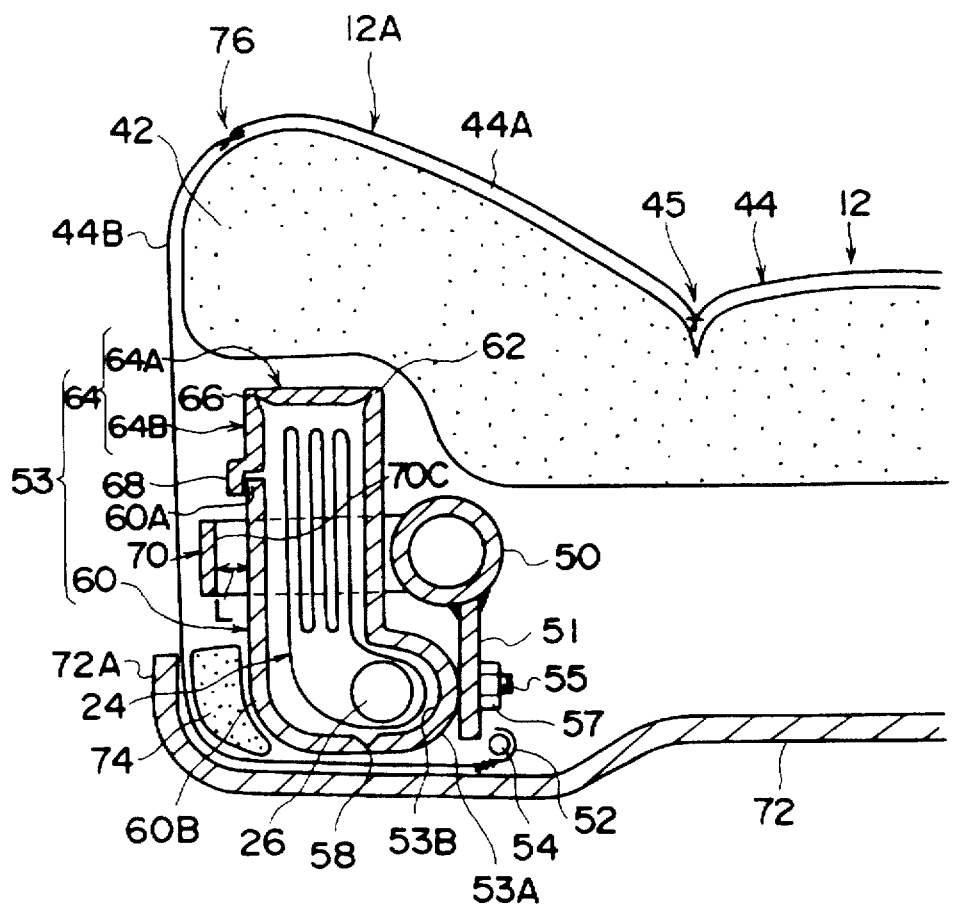
FIG. 6 is an enlarged sectional view taken along a line 6—6 of FIG. 9.
Figure 7:
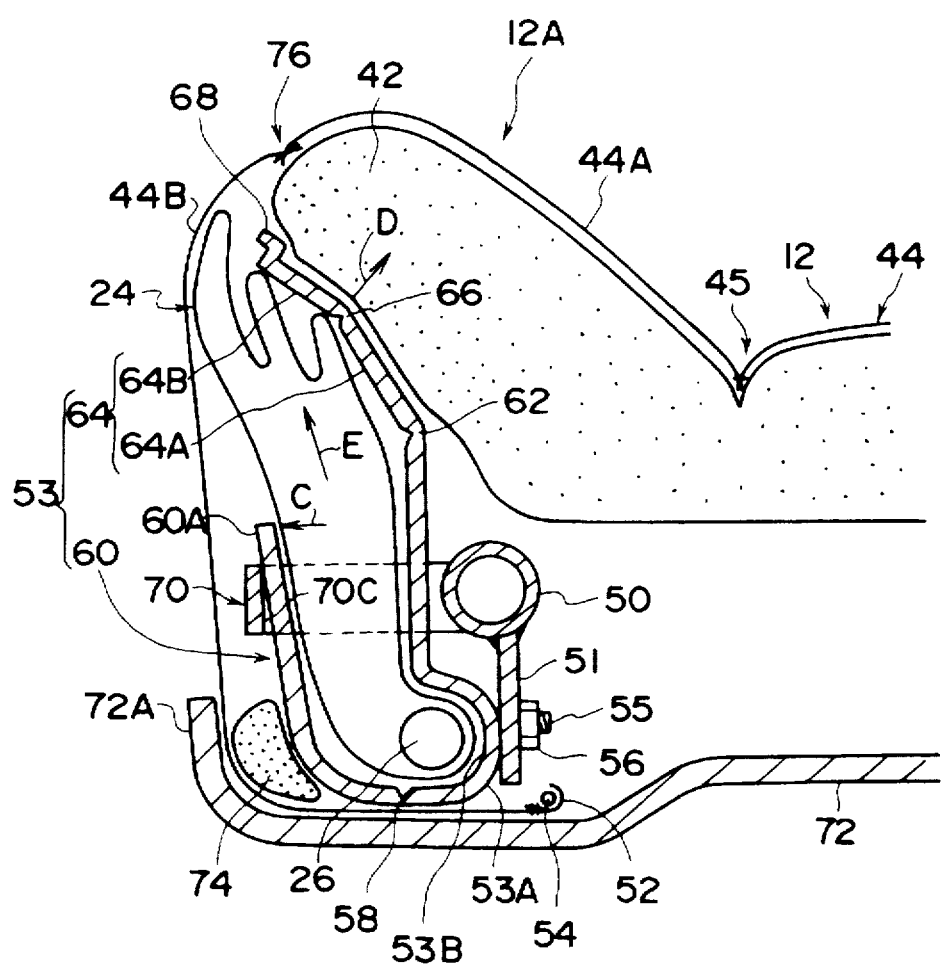
FIG. 7 is a cross-sectional view, which corresponds to FIG. 6, showing a state immediately after an air bag body of a seat structure equipped with a side impact air bag relating to a second embodiment of the present invention starts to unfold.

As illustrated in FIG. 6, a pipe-shaped seat back frame 50 is provided within the side portion 12A of the seat back 12 along the vertical direction of the seat. A mounting bracket 51 is connected to an outer circumferential rear portion of the seat back frame 50 (i.e., the outer circumferential portion of the seat back frame 50 in the rearward direction of the vehicle). An air bag case 53 is fixed to the mounting bracket 51. The air bag case 53 is integrally formed by a resinous material, and the cross-sectional configuration of the air bag case 53, when viewed in the vertical direction of the seat, is substantially rectangular. A stud bolt 55 is provided at the base portion 53A, which forms an inner portion of the air bag case 53 in the transverse direction of the seat. The stud bolt 55 penetrates through an unillustrated mounting hole punched at the mounting bracket 51. The air bag case 53 is fixed to the mounting bracket 51 by the stud bolt 55 and a nut 57, which is screwed to the stud bolt 55.

An outer lid 60 is integrally formed with the base portion 53A of the air bag case 53 at the rear end portion thereof in the longitudinal direction of the vehicle via an integral hinge 58 serving as a hinge portion. An inner lid 64 is integrally formed with the base portion 53A of the air bag case 53 at the front end portion thereof in the longitudinal direction of the vehicle via an integral hinge 62 serving as a hinge portion. The outer lid 60 forms a part of an outer wall portion of the air bag case 53 in the transverse direction of the seat and is provided so as to open outwardly in the transverse direction of the seat.

The inner lid 64 in a closed state (the state shown in FIG. 6) is bent in an L-shape when viewed from above. The bent portion which connects a front wall portion 64A and a side wall portion 64B is an integral hinge 66 serving as a hinge portion. As a result, the range over which the inner lid 64 opens towards the front of the vehicle is wider than that of the outer lid 60.

An engaging portion 68, which protrudes outwardly in the transverse direction of the seat, is formed at the rear end portion of the side wall portion 64B of the inner lid 64. The engaging portion 68 engages the outer portion of the front end edge portion 60A of the outer lid 60 in the transverse direction of the seat such that the outer lid 60 and the inner lid 64 form a French door structure.

As illustrated in FIG. 9, a stopper 70, which is formed by a highly rigid material, is mounted to the outer portion of the seat back frame 50 in the transverse direction of the seat. The stopper 70 extends in a vertical direction of the vehicle and is formed in a substantially U-shaped configuration in which the end portions thereof are oriented inwardly in the transverse direction of the seat. The stopper 70 is provided so as to cover an air bag body in the air bag case 53. Further, a distal end portion of an upper wall portion 70A of the stopper 70 and a distal end portion of an lower wall portion 70B thereof are connected to the seat back frame 50.

As illustrated in FIG. 6, a side wall portion 70C of the stopper 70 is provided so as to oppose the outer side of the outer lid 60 in the transverse direction of the seat at a distance of L. When the outer lid 60 is opened, the side wall portion 70C of the stopper 70 abuts the outer lid 60 such that the outer lid 60 does not open more than the predetermined angle of opening.

A folded air bag body 24 is contained within the air bag case 53. A concave portion 53B, whose longitudinal direction runs along a vertical direction of the seat, is provided at the rear portion of the base portion 53A along the longitudinal direction of the vehicle. A cylindrical inflator 26 is contained in the concave portion 53B along the vertical direction of the seat.

The end portion of a back board 72 in the transverse direction of the seat is bent forwardly so as to form a side wall portion 72A. A configuration-retaining pad 74 is disposed between the side wall portion 72A and a rear portion 60B of the outer lid 60.

Accordingly, when the air bag body 24 is unfolded due to the gas injected from the inflator 26, the engaging portion 68 of the inner lid 64 and the front end edge portion 60A of the outer lid 60 are disengaged. The outer lid 60 opens around the integral hinge 58 in the outward direction (the direction of arrow C in FIG. 7) of the seat, while the inner lid 64 opens around the integral hinges 62 and 66 in the inward direction (the direction of arrow D in FIG. 7) of the seat.

As shown in FIG. 6, an outer side of a seat pad 42 which covers an occupant abutting side with respect to the seat back frame 50 is covered by a seat surface layer 44. Several seat surface layers 44 are sewn at stitches 45, 76 and the like. When the air bag body 24 is unfolded, a standard stitch 76, which is disposed in a vicinity of a front end portion of a side surface of the seat back 12, is ruptured. The standard stitch 76 is a portion at which a seat surface layer 44A and a seat surface layer 44B which covers the side wall portion 64B of the inner lid 64 and the outer lid 60, are sewn together.

A hook 52 is fixed to the end portion of the seat surface layer 44B on the rear side of the seat. The hook 52 is engaged with a seat wire 54.

Next, the operation of the second embodiment will be explained.

In the seat structure equipped with the side impact air bag apparatus of the second embodiment, when the external force is applied to the side of the vehicle so as to operate the inflator 26 of the air bag apparatus 14, the air bag body 24 is inflated due to the gas injected from the inflator 26. Due to this inflating force of the air bag body 24, the outer lid 60 opens around the integral hinge 58 in the outward direction (the direction of arrow C in FIG. 7) of the seat, and the inner lid 64 opens around the integral hinges 62 and 66 in the inward direction (the direction of arrow D in FIG. 7) of the seat.

The opened outer lid 60 abuts the side wall portion 70C of the stopper 70 such that the outer lid 60 is prevented from opening more than the predetermined degree of opening. As a result, unfolding of the air bag body 24 in the outward direction of the seat is limited, and unfolding force of the air bag body 24 is concentrated on a diagonally forward direction (the direction of arrow E in FIG. 7) of the vehicle in accordance with the degree to which the outer lid 60 is opened.

Consequently, because the inner lid 64 is pressed by the air bag body 24 and opens so as to press the seat pad 42 from the outer side of the seat in the transverse direction thereof to the inner side thereof (the direction of arrow D in FIG. 7), the open area for unfolding of the air bag body 24 increases.

As a result, the air bag body 24 ruptures the standard stitch 76 and unfolds within the vehicle compartment without inflating too much outwardly in the transverse direction of the seat. Since the air bag body 24 smoothly unfolds without being blocked by the seat pad 42 and the seat surface layer 44, the time required for the air bag body 24 to completely unfold is reduced and the configuration of the unfolded air bag body 24 is stabilized.

Further, in the second embodiment, when the external force is applied to the side of the vehicle, the opening of the outer lid 60 in the outward direction of the seat is limited by the stopper 70 to the predetermined degree of opening. Thus, the opened outer lid 60 or the unfolded air bag body 24 does not interfere with an interior member of the vehicle such as a center pillar garnish to which the air bag body 24 opposes, and moreover, damage to the interior member of the vehicle to which the air bag body 24 opposes can be avoided. Accordingly, the air bag body 24 is not damaged by an edge or the like which may be generated due to the damage of the interior member of the vehicle, and unfolding of the air bag body 24 is not prevented by the edge or the like. Therefore, the air bag body 24 can be reliably unfolded.

Moreover, in the second embodiment, because the range over which the inner lid 64 opens towards the front of the vehicle is wider than that of the outer lid 60, the inner lid 64 opens a large amount so as to press the seat pad 42 from the outer side of the seat to the inner side thereof. Therefore, the locus of unfolding of the air bag body 24 can be further increased, and the unfolding direction of the air bag body 24 can be also controlled by the inner lid 64.

Figure 8:
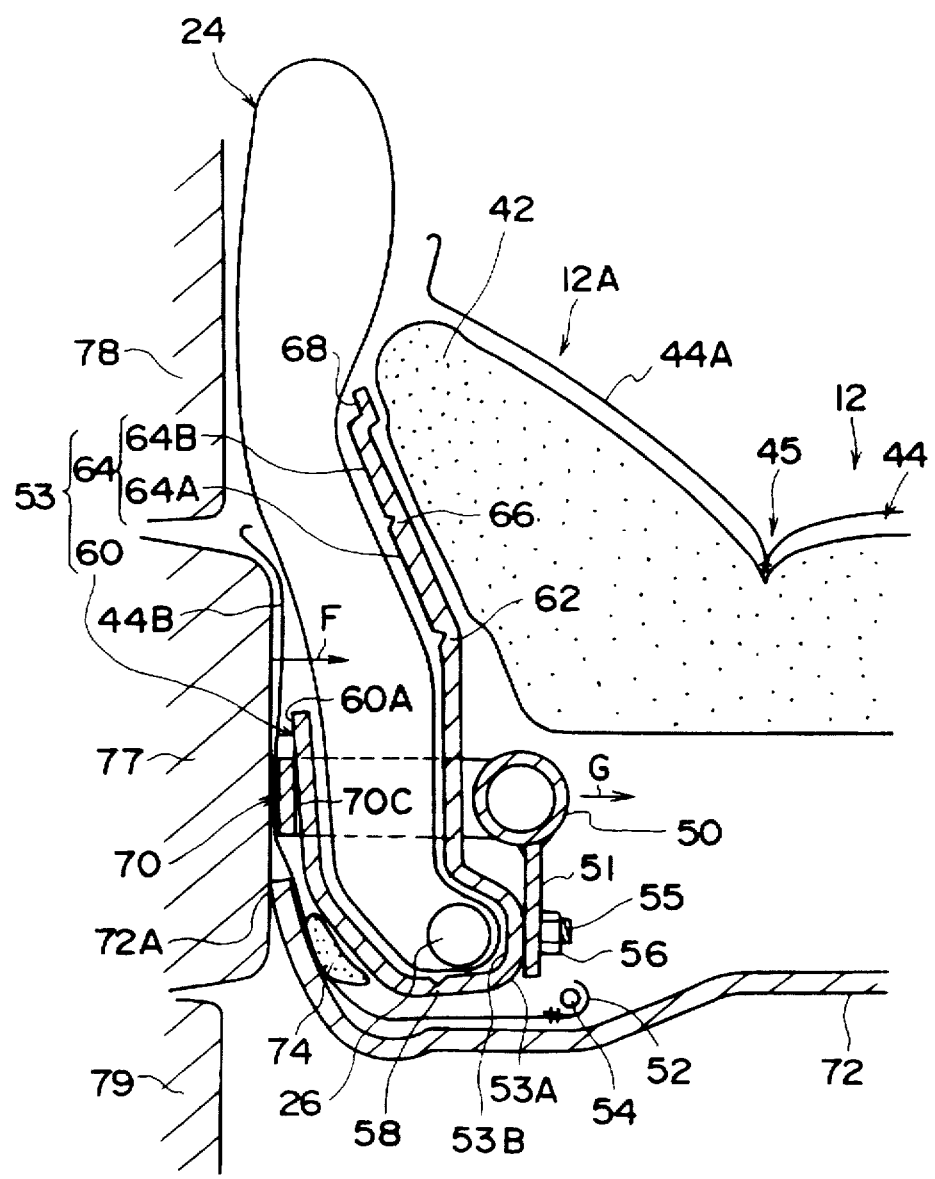
FIG. 8 is a cross-sectional view, which corresponds to FIG. 6, showing a state immediately after the air bag body of the seat structure equipped with the side impact air bag relating to the second embodiment of the present invention is completely unfolded.

Further, in the second embodiment, the substantially U-shaped stopper 70 formed by a highly rigid material is mounted to the outer portion of the seat back frame 50 in the transverse direction of the seat. The stopper 70 is provided so as to cover the air bag body within the air bag case 53. As a result, as shown in FIG. 8, when the external force is applied to the side of the vehicle, even if a center pillar garnish 77, a front (door trim 78, a rear door trim 79 and the like are moved in the inner direction (the direction of arrow F in FIG. 8) of the vehicle compartment, the stopper 70 receives the load and presses the seat back frame 50 in the inner direction (the direction of arrow G in FIG. 8) such that the substantially U-shaped space of the stopper 70 is maintained in the same state as its initial state. Therefore, the air bag body 24 in an unfolding state is not held between the stopper 70 and the seat back frame 50, and the air bag body 24 can be reliably unfolded.

In the above description, the specific embodiments of the present invention are described in detail. However, it is apparent to those skilled in the art that the present invention is not limited to these embodiments and that various other embodiments are possible within the scope of the present invention. For example, the tension-transmitting member is not limited to the stay cloth 49, and other member may be used provided that the member can reliably transmit the tension.

What is claimed is:

1. A seat structure for a vehicle equipped with a side impact air bag apparatus, said seat structure comprising:
   a seat back having a seat back frame;
   an air bag case made of resin and mounted to a side portion of the seat back frame, said air bag case having a lid;

an air bag body contained within said air bag case;

a seat pad disposed toward the front of the vehicle relative to said lid; and seat surface layers covering said seat pad and having a sewn portion, wherein, when an external force is applied to a side of the vehicle, the air bag apparatus is activated, the sewn portion is ruptured, and the air bag body is unfolded, said lid of said air bag case opening due to the unfolding of said air bag, and said seat pad being compressed by said lid toward an inner side of said seat back in a transverse direction of said seat back when said lid is opened.

2. A seat structure equipped with a side impact air bag apparatus according to claim 1, wherein said lid is an inner lid which opens toward the inner side of the seat back in the transverse direction of the seat back, said seat structure further comprising:

an outer lid which opens toward an outer side of the seat back in the transverse direction of the seat back, said inner lid and said outer lid forming a double door structure;

wherein a seat surface layer which is disposed further toward the front of the vehicle than said sewn portion is connected to said inner lid.

3. A seat structure equipped with a side impact air bag apparatus according to claim 2, wherein said air bag case includes hinge portions, and said outer lid and said inner lid are integrally formed with said air bag case via at least one respective hinge portion of said hinge portions.

4. A seat structure equipped with a side impact air bag apparatus according to claim 3, wherein said inner lid includes engaging means, and said engaging means directly engages the seat surface layer which is disposed further toward the front of the vehicle than said standard sewn portion.

5. A seat structure equipped with a side impact air bag apparatus according to claim 4, further comprising:

a tension-transmitting member which is provided so as to be connected to the seat surface layer which is disposed further toward the front of the vehicle than said sewn portion, said engaging means formed at said inner lid engaging the seat surface layer, which is disposed further toward the front of the vehicle than said sewn portion, via said tension-transmitting member.

6. A seat structure equipped with a side impact air bag apparatus according to claim 2, wherein said inner lid includes engaging means, and said engaging means directly engages the seat surface layer which is disposed further toward the front of the vehicle than said sewn portion.

7. A seat structure equipped with a side impact air bag apparatus according to claim 2, further comprising:

a tension-transmitting member which is provided to be connected to the seat surface layer which is disposed further toward the front of the vehicle than said sewn portion, and engaging means formed at said inner lid for engaging the seat surface layer which is disposed further toward the front of the vehicle than said sewn portion via said tension-transmitting member.

8. A seat structure equipped with a side impact air bag apparatus according to claim 1, wherein said lid is an inner lid which opens toward the inner side of the seat back in the transverse direction of the seat back, further comprising:

an outer lid which opens toward an outer side of the seat back in the transverse direction of the seat back, said inner lid and said outer lid forming a double door structure; and a stopper which limits the degree to which said outer lid opens to a predetermined range.

9. A seat structure equipped with a side impact air bag apparatus according to claim 8, wherein said inner lid is provided such that a range over which said inner lid opens is wider than the predetermined range over which said outer lid opens, and said outer lid and said inner lid are integrally formed with said air bag case via respective hinge portions formed at said air bag case.

10. A seat structure equipped with a side impact air bag apparatus according to claim 9, wherein said inner lid includes an engaging portion, wherein said engaging portion is disposed at a rear end portion of a side portion of said inner lid and engages said outer lid, said inner lid and said outer lid being provided such that said inner lid and said outer lid can be separated at said engaging portion due to the inflating pressure of the air bag body.

11. The seat structure according to claim 9, wherein said inner and outer lids are unequal in length.

12. The seat structure according to claim 8, wherein the stopper is fixed to a transverse direction side portion of the seat back frame.

13. A seat structure equipped with a side impact air bag apparatus according to claim 8, wherein said stopper is formed by a rigid material, a longitudinal direction of said stopper extends in a vertical direction of the vehicle, a cross-sectional configuration of said stopper is formed in a substantially U-shaped configuration in which end portions of said stopper are oriented inwardly in the transverse direction of the seat, and said stopper is fixed to a side portion of the seat back frame in the transverse direction of the seat so as to cover the air bag body.

14. The seat structure according to claim 1, wherein a rear end of the seat surface layers is connected to the seat back frame at a position transversely spaced from said sewn portion.

15. The seat structure according to claim 1, the air bag case and the seat pad being constructed and arranged with respect to each other so that, when the air bag unfolds, the seat pad is compressed inwardly without rupturing and the air bag unfolds around a side of the seat pad.

16. A seat structure for a vehicle equipped with a side impact air bag apparatus, said seat structure comprising:

a seat back having a seat back frame;

an air bag case mounted to a side portion of the seat back frame, said air bag case having a lid, said lid forming a double door structure, said lid including an outer lid which opens toward an outer side of the seat back in a transverse direction of the seat back an inner lid which opens toward an inner side of the seat back in the transverse direction of the seat back;

an air bag body contained within said air bag case; and seat surface layers having a sewn portion, said sewn portion being connected to said inner lid a one of the seat surface layers disposed further toward the front of the vehicle than said sewn portion being connected to said inner lid, wherein, when an external force is applied to a side of the vehicle, the air bag apparatus is activated, the sewn portion is ruptured, and the air bag body is unfolded, said lid of said air bag case opening due to the unfolding of said air bag.

17. A seat structure equipped with a side impact air bag apparatus according to claim 16, wherein said air bag case is made of a resin and includes hinge portions, and said outer lid and said inner lid are integrally formed with said air bag case via at least one respective hinge portion of said hinge portions.

18. A seat structure equipped with a side impact air bag apparatus according to claim 17, wherein said inner lid includes engaging means, and said engaging means directly engages the seat surface layer which is disposed further toward the front of the vehicle than said sewn portion.

19. A seat structure equipped with a side impact air bag apparatus according to claim 17, further comprising:

a tension-transmitting member which is provided so as to be connected to the seat surface layer which is disposed further toward the front of the vehicle than said sewn portion, said engaging means formed at said inner lid engaging the seat surface layer which is disposed further toward the front of the vehicle than said sewn portion via said tension-transmitting member.

20. A seat structure equipped with a side impact air bag apparatus according to claim 16, wherein said inner lid includes engaging means, and said engaging means directly engages the seat surface layer which is disposed further toward the front of the vehicle than said sewn portion.

21. A seat structure equipped with a side impact air bag apparatus according to claim 16, further comprising:

a tension-transmitting member which is provided so as to be connected to the seat surface layer which is disposed further toward the front of the vehicle than said sewn portion, and engaging means formed at said inner lid for engaging the seat surface layer which is disposed further toward the front of the vehicle than said sewn portion via said tension-transmitting member.

22. A seat structure for a vehicle equipped with a side impact air bag apparatus, said seat structure comprising:

a seat back having a seat back frame;

an air bag case mounted to a side portion of said seat back frame, said air bag case having a lid, said lid including an outer lid which opens toward an outer side of the seat back in a transverse direction of the seat back and an inner lid which opens toward an inner side of the seat back in the transverse direction of the seat back, said lid forming a double door structure;

an air bag body contained within said air bag case;

seat surface layers having a sewn portion; and a rigid stopper which limits the degree to which said outer lid opens to a predetermined range, wherein, when an external force is applied to a side of the vehicle, the air bag apparatus is activated, the sewn portion is ruptured, and the air bag body is unfolded, said lid of said air bag case opening due to the unfolding of said air bag.

23. A seat structure equipped with a side impact air bag apparatus according to claim 22, wherein said inner lid is provided such that a range over which said inner lid opens is wider than the predetermined range over which said outer lid opens, and said outer lid and said inner lid are integrally formed with said air bag case via respective hinge portions formed at said air bag case, and said inner lid includes an engaging portion disposed at a rear end portion of a side portion of said inner lid which engages said outer lid, and said inner lid and said outer lid being provided such that said inner lid and said outer lid can be separated at said engaging portion due to inflating pressure of the air bag body.

24. A seat structure equipped with a side impact air bag apparatus according to claim 22, wherein a longitudinal direction of said stopper extends in a vertical direction of the vehicle, a cross-sectional configuration of said stopper is formed in a substantially U-shaped configuration in which end portions of said stopper are oriented inwardly in the transverse direction of the seat, and said stopper is fixed to a side portion of the seat back frame in the transverse direction of the seat so as to cover the air bag body.

* * * * *